Dec. 1, 1964  M. E. ANDERSON  3,159,244
ELECTRIC MOTOR CONTROL
Filed Nov. 6, 1962
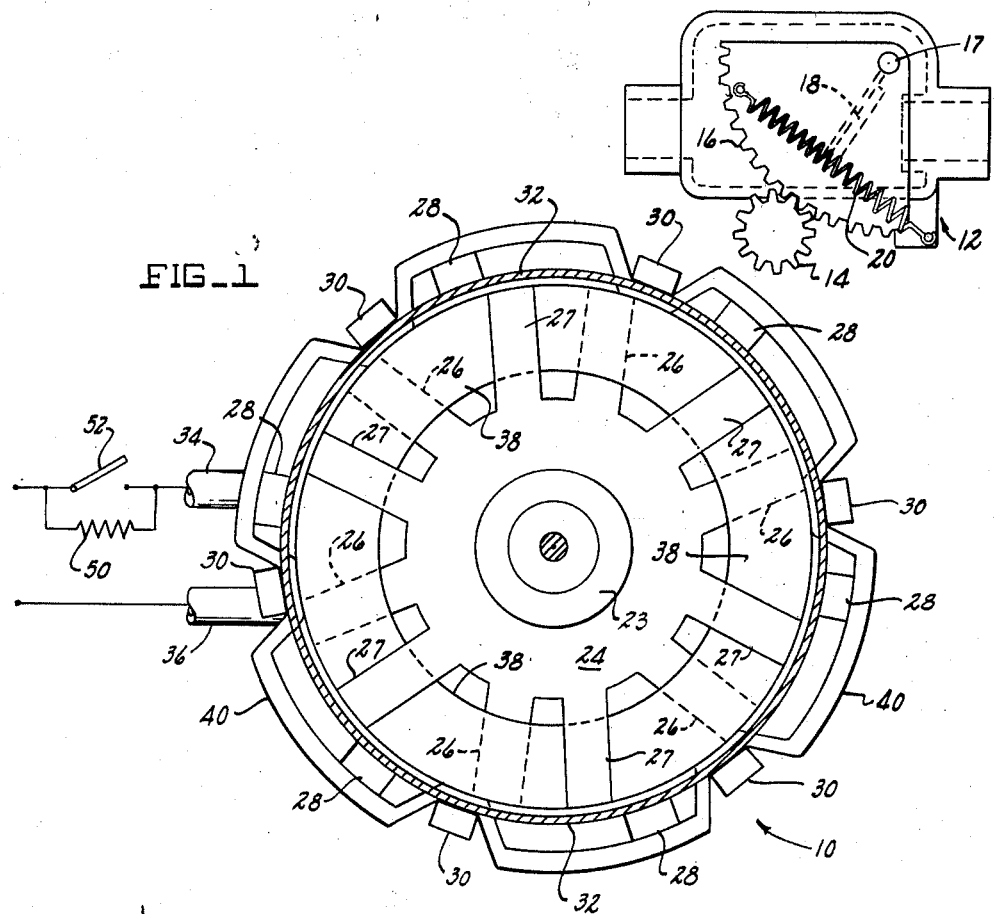
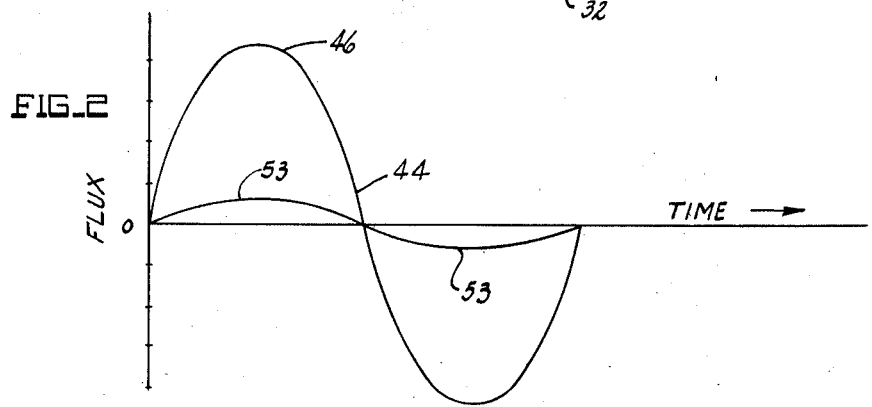
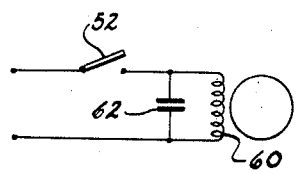
INVENTOR.
MAYNARD E. ANDERSON
BY Andrew K. Joulds
his ATTORNEY 3,159,244
ELECTRIC MOTOR CONTROL
Maynard E. Anderson, Birmingham, Mich., assignor to American Radiator & Standard Sanitary Corporation, New York, N.Y., a corporation of Delaware
Filed Nov. 6, 1962, Ser. No. 235,790
4 Claims. (Cl. 185—11)

This invention relates to control arrangements for small synchronous motors such as are used in operating fluid valves.

In fluid valves the valve element is sometimes operated between its open and closed positions by the opposing actions of an electric motor and spring. Thus in certain domestic heating systems the room thermostat serves to energize an electric motor which opens a valve in the line which feeds the room heat exchanger with hot water or other heat exchange fluid. While the valve is in its full open position the electric motor remains in a stalled but energized condition. Upon satisfaction of the thermostat the motor is de-energized and a spring thereupon moves the valve to its closed position.

The synchronous motors which are utilized in these applications are of the type wherein an energizing alternating current provides a rotating field which exerts a magnetizing action on the rotor. This magnetizing action is a necessary feature for motor operation, but in some instances it is a disadvantage when the motor is de-energized. Thus, at the moment of de-energization the rotor may have considerable residual magnetism therein which tends to lock the rotor in its stalled position and which thereby fights the action of the return spring tending to return the valve element to its closed position. In order to alleviate this situation it is conventional to utilize a fairly strong return spring which of course results in the need for a higher torque motor, since the spring constitutes part of the load on the motor during its energization period.

The present invention has as its primary object the provision of a control circuit for the motor which minimizes or substantially cancels the above-mentioned residual magnetism, and thus permits the use of a lighter return spring and lower torque motor than is conventional in the art.

A further object of this invention is to provide the above magnetism-cancellation action at fairly low cost.

Other objects of this invention will appear from the following description and appended claims, reference being had to the accompanying drawings forming a part of this specification wherein like reference characters designate corresponding parts in the several views.

In the drawings:

FIGURE 1 is a schematic view showing the invention as embodied in an electric motor-operated fluid valve;

FIG. 2 is a chart illustrating the flux change in a motor as constructed in FIG. 1; and FIG. 3 is a circuit diagram for a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 there is shown an electric motor generally designated by the numeral 10, and a fluid valve designated generally by numeral 12. The rotor of motor 10 is arranged to drive a small gear 14 in a counterclockwise direction through speed reduction gearing (not shown), and gear 14 in turn drives the sector gear 16 in a clockwise direction around the axis defined by pivot shaft 17. This action in turn operates the flap-type valve element 18 to the open position. When motor 10 is de-energized the tension spring 20 becomes effective to return valve element 18 to its closed position. This general arrangement of motor 10, valve element 18, and spring 20 is conventional and may be used in various fields, as for example in the domestic room heating field where it is desired to flow hot water through the valve upon the call for room heat, and to interrupt the flow of hot water upon satisfaction of the room thermostat.

The motor shown in FIG. 1 is similar to that disclosed in issued Patent 2,298,373. It comprises a fixed tubular hub 23 having the upper end thereof secured to a disc-like pole member 24 which is provided with twelve outwardly radiating arms 26 and 27. These arms constitute pole pieces which cooperate with additional axially extending pole pieces 28 and 30 in magnetizing the hardened steel rotor ring 32. Energization of the pole pieces is effected by means of an electric field coil (not shown) which surrounds hub 23 and which has input leads 34 and 36.

It is necessary in this type motor to provide for rotation of the magnetic flux between the various pole pieces. To provide for this flux rotation there are utilized two copper shading rings 38 and 40. Ring 40 is arranged to partially surround the pole pieces 30 so as to shade same, and ring 38 is arranged to partially surround pole pieces 27 so as to shade same, all as more particularly shown and described in the aforementioned patent.

In operation of this motor, when the leads 34 and 36 are connected to a source of alternating current the electric field coil in the motor is energized so that a magnetic flux is passed between the pole pieces 30 and 26, and between pole pieces 28 and 27. Each of the shading rings 38 and 40 has a voltage induced in it which establishes a secondary magnetic flux opposing the main magnetic flux. The magnetic flux produced by the shading lags behind the main flux so that a resultant rotating effective magnetic flux is established across the cooperating pole pieces, all for the purpose of exerting a rotating magnetic action on rotor 32.

The hardened steel rotor is thus rotated in accordance with the number of poles in the motor and the frequency of the alternating current supplied through leads 34 and 36. The hardened steel rotor is of particular value in that it retains its magnetizing force for a time after the flux has decreased. Thus the rotor polarities linger after the stator flux passes on so that the rotor is strongly attracted by the rotating flux field. Any tendency of the rotor to slip is alleviated since the rotor is attracted by the moving field so that it revolves at synchronous speed.

While the use of a hardened steel rotor 32 is advantageous when the motor is operating, yet at the moment when the motor is de-energized the hardened steel rotor may have a considerable residual magnetism in it which tends to lock the rotor in its stalled position. Lesser residual magnetism may exist in the soft iron pole pieces. The locking action produced by the residual magnetism is undesirable in that it necessitates the use of a heavier spring 20, and hence a more powerful motor to overcome the heavier spring force during motor-on periods.

The value of the residual magnetism may vary depending on when the motor is de-energized in the flux cycle. Thus, in the event of complete power failure the capacitor should be de-energized when the effective flux is at point 44 there will be very little residual magnetism in the rotor 32. However if the motor should be de-energized when the effective flux is at point 46, considerable residual magnetism will exist in the rotor. This residual magnetism exerts a locking or holding action as above mentioned, so that the rotor exerts a drag against the valve closing action of spring 20.

In order to reduce the residual magnetism there is utilized in the FIG. 1 arrangement a control circuit which includes a resistance 50 arranged in parallel with the motor-control switch 52 (which could for example be a room thermostat). Resistor 50 has a value such that when the motor switch 52 is open a reduced sustained voltage is applied through resistance 50 onto the field of the motor. In the case of a 120 volt, 60 cycle circuit, resistance 50 is chosen to give an A.-C. sustained voltage preferably on the order of 25 volts. This reduced voltage has the effect of reducing the magnetic flux flowing across the pole pieces 30 and 26, and 28 and 27, to the small value shown generally by curve 53 in FIG. 2. This reduced flux is found to have a de-magnetizing action on rotor 32 so that the rotor has a lessened tendency to lock in its stalled position when switch 52 is opened.

Tests run with motors of the type shown in FIG. 1 show that when the motor is controlled without resistance 50 and the motor is de-energized after applying 120 volts thereto, the torque necessary to break the rotor from its stalled position approximates 125 to 150 gram-inches. When the same motor is controlled by a circuit wherein a sustained voltage of 20 volts is applied through resistance 50 the break away torque is only about 50 gram-inches. When resistance 50 is chosen to give a sustained voltage of about 25 volts the break away torque reduces to about 35 gram-inches. When the sustained voltage is 35 volts the break away torque reduces further to 30 gram-inches, which is not appreciably different from the results with the 25 volt applied voltage. Choosing resistance 50 to give a sustained voltage of 45 volts gives a break away torque of about 35 gram-inches.

It can be seen that reduction in break away torque can be achieved through the use of a sustained applied voltage, as through a resistance 50. The value of this sustained applied voltage can be varied within limits, but in the case of a 120 volt system a sustained voltage of about 25 volts is preferred.

As previously noted the reduction in break-away torque is advantageous in that it permits the use of a relatively light spring 20. Since spring 20 constitutes part of the motor load when the motor is moving the valve element to its open position, it follows that the employment of a lighter spring 20 permits a lower torque motor to be employed in the control device, all with the effect of reducing costs and/or improving safety factors.

The drawings show the invention as employed with a motor 10 having a ring-type rotor 32 arranged between cooperating radial and axially directed pole pieces. It is contemplated however that the invention can be employed with other motor constructions, as for example those shown in issued Patents 2,353,305 or 2,583,180 or 3,041,487.

As shown in FIG. 1 of the instant drawings the sustained demagnetizing voltage is provided by a resistance 50 which feeds the voltage to the field coil of the motor. It is contemplated however that other arrangements can be employed; for example the motor could be provided with two separate windings, one of which would be energized during the motor-off periods to exert a demagnetizing action on the rotor. Another method would be to provide two windings on an excitation transformer to thus provide the demagnetizing action during the motor-off periods.

One additional method which has been successfully employed is shown by diagrammatic FIG. 3, wherein numeral 60 represents the field coil of the motor, and numeral 62 represents a capacitor arranged in parallel with the field coil. Using a small hysteresis synchronous motor of the general type shown in above-mentioned Patent 2,298,373 I was able to significantly reduce the breakaway torque of the motor with a 0.1 microfarad capacitor.

The theory in using a capacitor as shown in FIG. 3 is that when switch 52 is opened the combined effect of the capacitor and the inductance of the motor coil provides a continuing current oscillation. Fortunately in those instances when the coil current at shut-off is a maximum (and when the residual magnetism is most detrimental) the coil inductance is highest. The electrical flywheel effect of the coil then provides the charging current for the capacitor when switch 52 is opened. The capacitor arrangement of FIG. 3 behaves somewhat differently than the resistor arrangement of FIG. 1 in that the capacitor gives a decaying current oscillation rather than a continually sustained oscillation as in the case of the resistor. However actual tests with the FIG. 3 arrangement have demonstrated its usefulness.

One advantage of the FIG. 3 arrangement is that it permits the capacitor to be connected directly across the motor as a self-contained unitary part of the motor wiring. The FIG. 1 arrangement may on the other hand not be so adaptable when the motor is controlled by a series of switches 52 (e.g., in a room heating environment when the motor may be controlled by a room thermostat and a limit switch in the furnace heat exchanger); thus, connecting resistor 50 in parallel with a series of switches 52 might in some cases involve some lengthy wiring which is avoided in the FIG. 3 arrangement.

A further advantage of the FIG. 3 arrangement is that capacitor 62 functions on a completely open circuit whereas resistor 50 requires a continuing source of current. Thus, referring to FIG. 2, if the field coil of the motor still performs the demagnetizing function.

An added advantage of the FIG. 3 capacitor is that it appears to give the motor a somewhat higher starting and running torque than when the capacitor is not used. It is theorized that this results, in part at least, from the demagnetized condition of the rotor and pole pieces. Thus, there is no large amount of residual magnetism to block the free rotation of the rotor, and it is correspondingly easier for the rotating field to establish a new magnetic polarity in the hardened steel ring and to start the rotor turning.

The invention is presently believed to be most useful in the control of fluid valves as shown in FIG. 1. However, within its broader aspects it is believed that the invention can be employed in other environments, particularly where an electric motor and return spring are utilized to operate a driven control member in opposite directions.

What I claim as my invention is as follows:

1. In the control of a 120 volt A.C. synchronous motor which is equipped with a magnetizable rotor, the improvement comprising means for energizing the field of such a motor through a circuit which includes an on-off switch and voltage-applying means so that when the switch is in the off position a voltage of approximately 25 volts is applied to the motor field for causing a demagnetizing action to be exerted on the rotor.

2. In an operator which comprises a reciprocable driven member, an A.C. synchronous motor having a field and a magnetizable rotor for driving said member in one direction, and a spring for driving said member in the other direction; the improvement comprising a control circuit for the motor which includes means operable at one time for applying a relatively high A.C. voltage to the motor field sufficient to operate the rotor and driven member in said one direction against the opposition of the spring, and operable at a second time for applying a relatively low A.C. voltage to the motor field to exert a demagnetizing action on the rotor such as to enable the spring to drive the aforementioned member in its other direction.

3. The combination of claim 2 wherein the relatively high A.C. voltage is about 120 volts, and the relatively low A.C. voltage is about 25 volts.

4. The combination of claim 2 wherein the reciprocable driven member takes the form of a fluid valve element.

References Cited in the file of this patent

UNITED STATES PATENTS

| | | |
|---|---|---|
| 1,077,319 | Tatum | Nov. 4, 1913 |
| 2,222,990 | Shipley et al. | Nov. 26, 1940 |

FOREIGN PATENTS

| | | |
|---|---|---|
| 801,834 | France | May 30, 1936 |